Dec. 8, 1936.  T. ONGARO  2,063,117

MECHANISM FOR TRANSMITTING POWER

Filed Sept. 29, 1933  4 Sheets-Sheet 1

INVENTOR.
Theodore Ongaro.

BY
Corbett & Mahoney
ATTORNEYS

Dec. 8, 1936.  T. ONGARO  2,063,117
MECHANISM FOR TRANSMITTING POWER
Filed Sept. 29, 1933   4 Sheets-Sheet 2
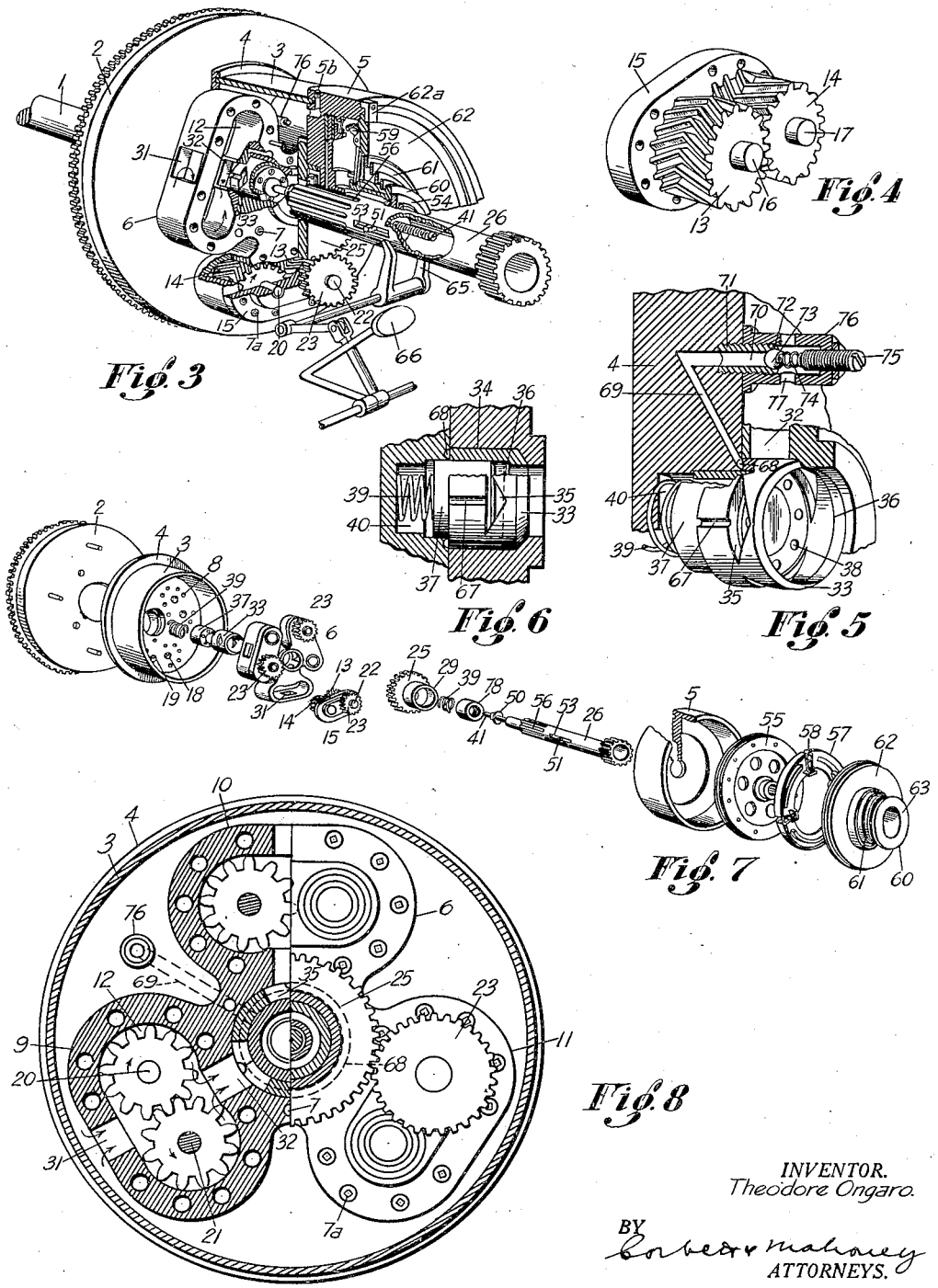
INVENTOR.
Theodore Ongaro.
BY
ATTORNEYS.

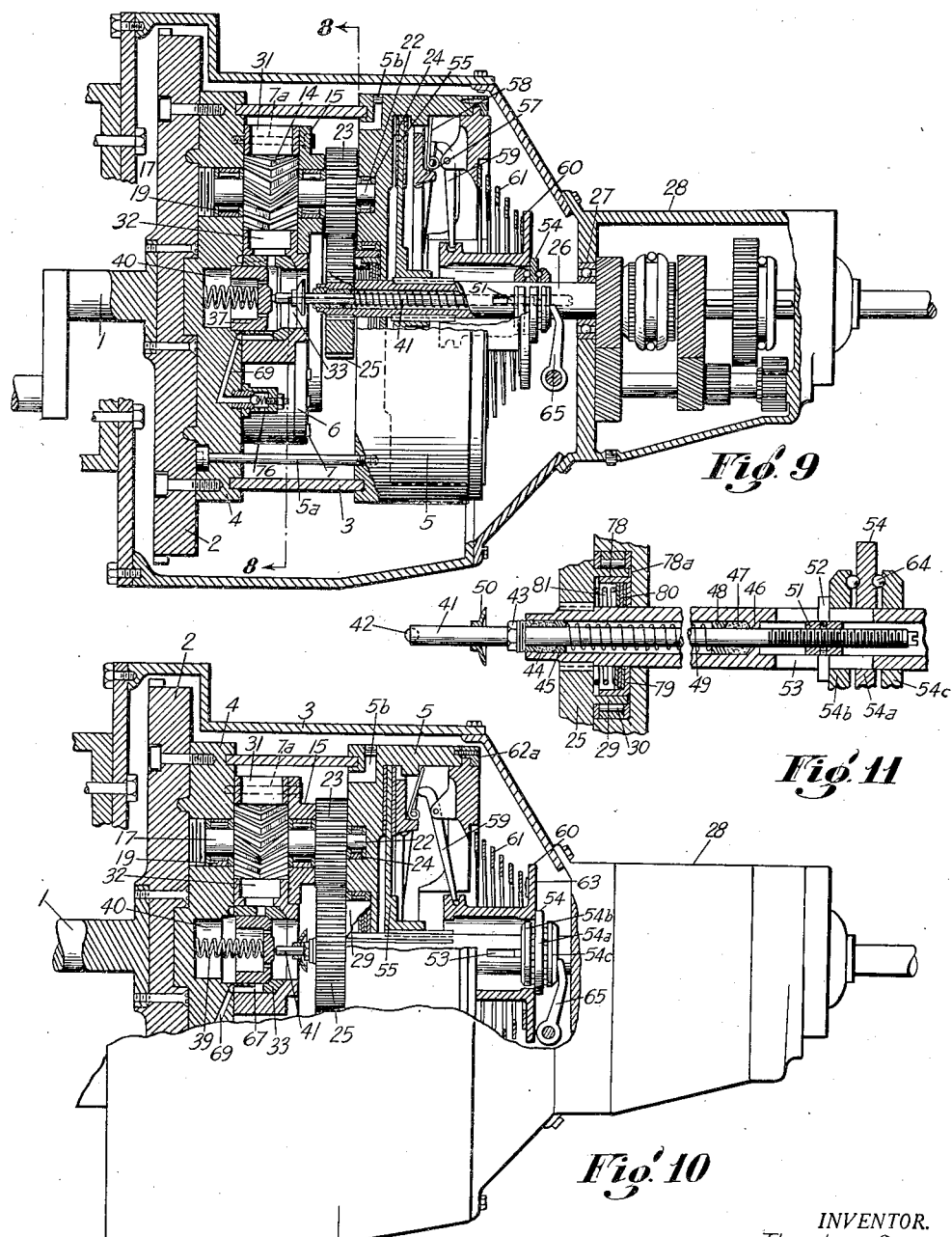

Dec. 8, 1936.  T. ONGARO  2,063,117
MECHANISM FOR TRANSMITTING POWER
Filed Sept. 29, 1933  4 Sheets-Sheet 4

INVENTOR.
Theodore Ongaro.
BY
Corbett & Mahoney
ATTORNEYS.

Patented Dec. 8, 1936

2,063,117

UNITED STATES PATENT OFFICE 2,063,117

MECHANISM FOR TRANSMITTING POWER

Theodore Ongaro, Columbus, Ohio, assignor of two-fifths to Clarence E. Palmer, Bexley, Ohio Application September 29, 1933, Serial No. 691,512

17 Claims. (Cl. 74—294)

My invention relates to a mechanism for transmitting power. It has to do particularly with the transmission of power in motor driven vehicles. However, it is applicable in various other mechanisms and is in no sense limited to vehicles. It is particularly applicable to the transmission of power from a rotating driving shaft to a rotating driven shaft.

In the prior art, numerous efforts have been made to simplify and render more flexible the transmission of power from a rotating driving shaft to a driven shaft which is to be rotated thereby. These efforts have been directed primarily to the improvement of transmission mechanism for motor vehicles, though the mechanisms proposed have supposedly been applicable to broader uses.

One type of mechanism which has been subject to considerable effort in the prior art has been the so-called hydraulic clutch. Devices of this type ordinarily involve the transmission of power by means of a clutch wherein one of the clutching units is moved into clutching relation with the other by means of a fluid actuated piston structure. These devices are of limited application because they ordinarily provide no means for changing the speed and torque of the driven shaft with relation to the speed and torque of the driving shaft.

Another type of mechanism which has found some favor is the centrifugally operated transmission mechanism. In some forms, these devices involve mechanism which permit of driving the driven shaft at different speeds with relation to the driving shaft. However, such devices possess serious drawbacks which tend to militate against their ultimate success, particularly in the operation of motor vehicles. Chief among these drawbacks is the entirely automatic nature of certain of the speed changes which seriously interferes with the prompt adjustment of these devices to meet the different driving conditions which inevitably arise in the operation of any motor vehicle. For example, where the high speed drive of a motor vehicle is dependent upon centrifugally operated mechanism responsive only to a given speed, it frequently becomes necessary to wait for a substantial period of time in order to render the second speed driving mechanism effective, though the actual driving conditions demand that such second speed mechanism be rendered immediately effective. For example, with such a device, in driving up a hill at high speed, the driver may desire to shift into the second speed drive in order to give additional power driving actions but he must await the lowering of the speed of rotation of the driving and driven shafts to the point where the centrifugally operated mechanism effects the desired change. Likewise, with a device of this type, the operator is powerless to change from second to high until the predetermined rate of rotation is arrived at, though conditions may indicate that an earlier change is desirable.

Still another type of mechanism to which considerable effort has been devoted involves the disposition in between the driving shaft and the driven shaft of fluid-actuated members for transmitting power from the driving shaft to the driven shaft. Devices of this type ordinarily involve an undesirable amount of slippage, if sole reliance is placed upon them. Because of this, it has been suggested that devices of this type be used in combination with clutches for ultimately effecting a positive drive of the driven shaft by the drive shaft. The devices of this type with which I am familiar, however, have all possessed important disadvantages from the standpoint of cost and, more particularly, from the standpoint of efficiency of operation.

It has already been pointed out that there is a certain amount of slippage where the fluid-actuated mechanism alone is relied upon. This slippage is sufficiently great as to render a drive of this kind impracticable, particularly in the operation of motor vehicles, wherein certain and prompt controllability is at all times necessary. Also, the mounting of a mechanism of this type upon the driven shaft results in the creation of a fly-wheel effect upon the motor which creates one condition when the driven shaft is being rotated and an entirely different condition when the driven shaft is stationary. Numerous other drawbacks of prior art devices of this type will appear as the description of my invention and the advantages thereof are set forth in the following description.

In its preferred embodiment, my invention contemplates the provision of a flowing power transmission mechanism in combination with a friction clutch mechanism, both of which are mounted practically in their entirety upon the fly-wheel of the crank shaft of the motor. These units are preferably used in conjunction with a low gear and a reverse gear and take the place of the second gear and the first gear, though they provide an infinite number of speed changes between the initiation of the action of the flowing power transmission mechanism and the effective actuation of the friction clutch. As indicated, the mechanism is so arranged that the flowing power transmission mechanism becomes effective as the low speed gear is rendered ineffective and gradually increases in effectiveness until it is finally replaced by actuation of the friction clutch. In pursuance of this plan, the control for the flowing power transmission mechanism and the friction clutch which finally becomes effective is attained through the medium of a pedal lever, substantially identical with the normal clutch lever of a motor vehicle, which is so connected that gradual release of pressure upon the pedal lever results in gradual building up of pressure in an effectiveness of the flowing power transmission mechanism until the maximum effectiveness thereof is obtained, whereupon the friction clutch mechanism becomes effective to produce a direct driving of the driven shaft from the drive shaft.

The preferred embodiment of my invention is shown in the accompanying drawings wherein similar characters of reference designate corresponding parts and wherein:

Figure 3 is a perspective view of a fly-wheel disk mounted on the crank shaft, with my flowing power transmission mechanism and friction clutch shown thereon in partial section.

Figure 4 is a perspective view of the herringbone gears which form the rotatable members of one of my pump structures, shown removed.

Figure 5 is a detail, in perspective and partially broken away, of the valve structure which controls my flowing power transmission mechanism together with a safety check valve which I preferably use in connection therewith.

Figure 6 is a side elevation, partially in section, illustrating my valve structure.

Figure 7 is a perspective view of the essential parts of my apparatus which are shown in disassembled relation to more clearly illustrate the structure of the different units forming a part thereof.

Figure 8 is a section taken on line 8—8 of Figure 9 and illustrating certain parts of my flowing power transmission mechanism.

Figure 9 is a vertical longitudinal section of the principal parts of my apparatus shown in conjunction with the crank shaft and the fly-wheel disk upon which they are mounted, the parts being shown in the position in which the driven shaft is not being driven.

Figure 10 is a side elevation, partially broken away, illustrating the parts shown in Figure 9 and showing the position which they assume after the flowing power transmission mechanism has attained maximum effectiveness and the friction clutch has become fully effective.

Figure 11 is a detail, partly in section, of the mechanism which I preferably use for actuating in one direction the valve which controls my flowing power transmission mechanism.

Figure 1:
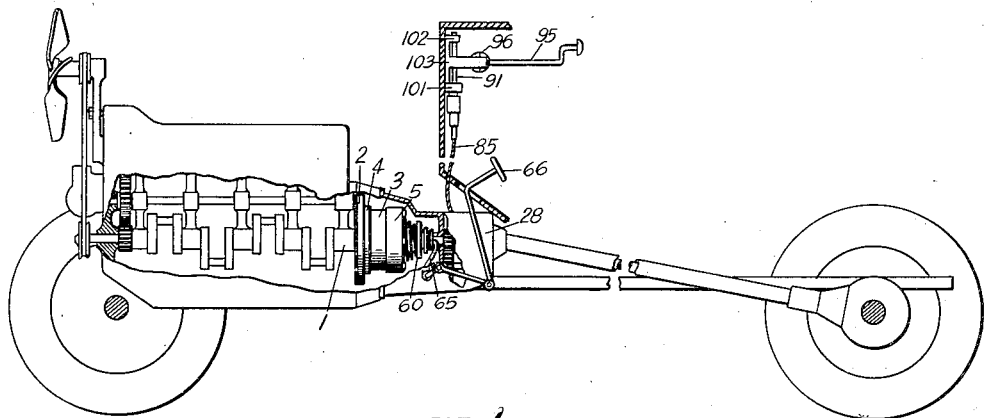
Figure 1 is a side elevation, partially broken away, of a portion of a motor vehicle, with my apparatus applied thereto.
Figure 2:
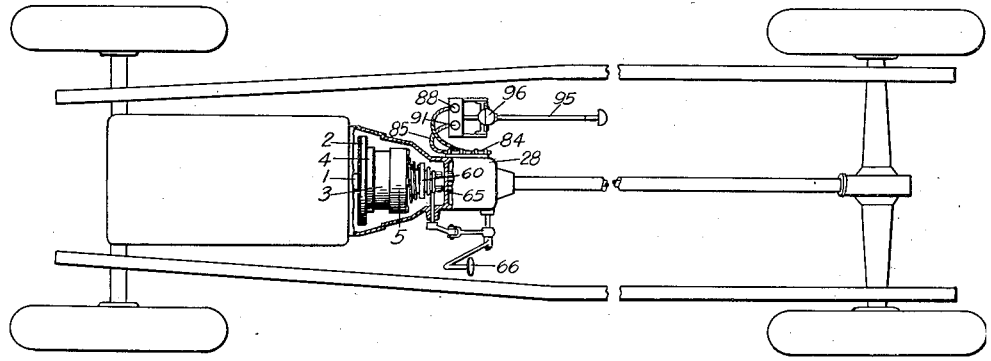
Figure 2 is a plan view of the structure shown in Figure 1.

In the drawings, the crank shaft of an automobile is shown at 1. This crank shaft has mounted thereon, in the usual way, a fly-wheel disk 2, which is of reduced weight.

On the rear face of the fly-wheel disk, as illustrated best in Figures 1, 3 and 9, is a cylindrical casing 3 which is closed at one end by means of a disk 4 of slightly greater diameter. This disk 4 may be secured to the rear face of the fly-wheel disk by bolts. The opposite end of the cylindrical casing 3 is disposed in an annular socket in the forward face of the clutch housing 5, the cylindrical casing 3, the disk 4 and the clutch housing 5 being held assembled to produce a fluid chamber by means of bolts 5a. Fluid may be introduced into this chamber by means of a plurality of ports such as shown at 5b in Figures 3 and 9. The fluid chamber thus formed is also designed to contain the majority of the parts that enter into the construction of my flowing power transmission mechanism.

These parts of my flowing power transmission mechanism comprise a triangular casting 6 which is designed to be bolted to the disk 4 by means of bolts 7 extending into bolt holes 8 in this disk 4. This triangular casting 6 preferably comprises three housing units 9, 10 and 11 which are identical in structure and which are each designed to receive and contain a pair of gear pumps. Since these gear pumps are identical in structure, it is only necessary to describe one pair.

The main parts of these gear pumps are illustrated in Figure 4 where they are shown removed from the chamber 12 in which they are normally housed. These parts comprise two intermeshing herring-bone gears 13 and 14, one of which drives the other. The use of herringbone gears for this purpose results in a greatly increased efficiency, due to the fact that the teeth of these gears maintain uniform contact at all times while the endwise thrust thereof is eliminated by the very nature of the gears. Of even greater importance is the fact that the gears are exceptionally quiet in operation at high speeds as well as at low speeds.

These herring-bone gears are carried in intermeshing relation by a plate 15 and by the disk 4. To effect this, the gears are provided at one end with spindles 16 and 17 which are journaled in bearings 18 and 19 formed directly in the rear face of the disk 4, while the opposite ends of the gears are likewise provided with spindles 20 and 21 which are journaled in bearings carried by the plate 15 which is bolted to the face of the disk 4 by bolts 7a.

As illustrated in Figures 7, 8 and 9, the spindle 21 carries a reduced extension 22 upon which is keyed a gear 23. This reduced extension 22 is likewise supported at its outer end in a bearing 24 carried in the forward face of the clutch housing 5 to be subsequently described.

It will be apparent from this description that, with three sets of gear pumps, there are provided three gears such as gear 23. These three gears form parts of a planetary gear system and are disposed around and in intermeshing relation to a sun gear 25 in which the driven shaft 26 is removably keyed which is in turn supported by a bearing 27 in the forward end of the transmission casing 28. The sun gear, however, is provided on its rear face with an annular flange 29 supported in a bearing 30 carried in the front face of the clutch housing 5.

By reference to Figure 8 and the arrows applied thereto, it will be noted that the fluid which is disposed within the cylindrical casing 3 is designed to be pumped inwardly from points adjacent the inner periphery of this casing in radial paths terminating adjacent the axis of the driving shaft. Thus, the fluid is designed to enter the ports 31 and be carried around the walls of the chamber 12 by the pumping gears and thereby forced into the ports 32. The passage of this fluid through the ports 31, around the gears and through the ports 32 is under the control of an axial valve structure which is illustrated best in Figures 5, 6, 8, 9 and 10.

This valve structure comprises an outer valve seat unit 33 which is fitted closely within the axial opening 34 of the casting 6 and which is provided with a port 35 for each of the ports 32 in the casting. This outer valve seat unit takes the form of a sleeve which carries upon its inner periphery a beveled shoulder 36 which is disposed in the rear of the ports 35 and which is designed to serve as a valve seat, as will be subsequently made clear.

The valve itself is designated 37 and is cup-shaped in form. It fits closely within the outer valve seat unit and is operable to close the ports 35 and seat upon the seat 36 or to open the ports 35 to any desired extent. Its rear edge is beveled to correspond with the bevel of the seat 36 and it is provided with ports 38 to facilitate the escape of fluid from the interior thereof so as to prevent the formation of a fluid cushion behind the valve which would tend to retard the prompt action of this valve.

The ports 35 in the outer valve seat unit 33 are of special form, in that they are of triangular contour. As illustrated in Figure 6, each triangular port has a base disposed adjacent the disk 4 and its apex relatively remote therefrom. The result is that the valve 37, in its movement to closed position progressively restricts these ports in such a manner that the passage of fluid therethrough is restricted more sharply during the early closing stages of the valve than during the final closing stages thereof. This permits of the provision of ports which, when uncovered by the valve, give ample passageway for the unrestricted flow of the fluid in response to the action of the gear pumps. At the same time, the shape of these ports is such that they can be markedly restricted and then completely closed with a minimum travel of the valve. The importance and advantage of this will subsequently appear.

The valve is movable towards closed position by means of a coil spring 39 which fits within the cup valve 37 and bears at one end against the inner face thereof. The opposite end of this coil spring extends into a socket 40 in the disk 4 and bears against the base of this socket, the result being that the compressed spring constantly tends to urge the valve towards closed position.

This valve is movable towards open position by means of a thrust rod 41 which carries anti-friction ball 42 in its forward end that contacts with the rear face of the valve 37. The rod 41 is carried within the cylindrical driven shaft 26 by means of a structure especially provided to prevent the passage of fluid into and through the cylindrical driven shaft. This structure comprises, at the forward end thereof, a threaded sleeve nut 43, a packing unit 44 and a follower 45 for compressing the packing unit. At its rear end, it comprises an internal shoulder 46 of annular form which is an integral part of the cylindrical driven shaft, a packing unit 47 and a follower 48. The followers 45 and 48 are normally forced apart by the coil spring 49 which surrounds the thrust rod 41 and bears at its ends against such followers with sufficient force to insure an entirely leak-proof structure. As a supplement to this leak-proof structure, there is mounted upon the forward end of the rod 41 a baffle washer of shallow bell-like form 50 which serves to deflect the fluid away from the forward end of the cylindrical driven shaft and to decrease the pressure of the fluid with relation thereto.

It will be understood that the thrust rod 41 is reciprocable within the leak-proof structure just described. This is effected by means of a collar 51 which is adjustably threaded upon the rear end of the rod 41 and which carries radially extending pintles 52. These pintles 52 project through longitudinal slots 53 which are provided in the walls of the cylindrical driven shaft 26. These pintles 52 extend into cooperative relation with a double direction throw-out bearing 54 which is reciprocable upon the cylindrical driven shaft 26 and which is operable to simultaneously actuate the thrust rod 41 and valve 37 and the friction clutch to be described.

The friction clutch may take various forms but, in the form shown, it embodies a driven plate 55 which is splined upon the driven shaft 26 by means of spline keys 56. Mounted for cooperation with the driven plate 55 is a pressure plate 57 and a plurality of springs 58 which normally tend to move the pressure plate away from the driven plate, though this tendency is normally overcome by the toggle levers 59, the actuating collar 60 and the coil spring 61 which is disposed between the rear surface of the clutch cover 62 and the forward surface of the rear flange of the throw-out hub 63 which cooperates with the double direction throw-out bearing 54. It will be apparent that the clutch cover is bolted to the rear face of the clutch housing by bolts 62a.

The double direction throw-out bearing 54 is especially designed to perform its dual function with facility. It comprises the central collar 54a of relatively large diameter which contacts with the rear face of the flange 63 for transmitting actuating pressure to the actuating collar 60 to release the friction clutch. It also comprises collars 54b and 54c which are disposed on opposite sides of the collar 54a and which are of substantially smaller diameter. These collars 54b and 54c are separated from the collar 54a by anti-friction members which may be generally designated 64. The throw-out bearing 54 is reciprocable upon the driven shaft by means of the yoke lever 65 which is actuated in a manner that will be readily understood by the pedal lever 66.

It will be readily understood from this that application of adequate pressure on the pedal lever 66 will serve to move the throw-out bearing so that actuating pressure is applied to the pintles 52 by the collar 54b, with the result that the thrust rod 41 moves the valve 37 towards open position. At the same time, the collar 54a exerts pressure upon the actuating collar 60 to release the clutch. Thus, the throw-out bearing performs a double duty and, owing to its special structure, it effectively applies dual pressures to overcome both the small resistance of the valve 37 and the relatively great resistance of the clutch.

In order to avoid undue strain or breakage in the event that the controlling valve 37 is closed too suddenly, I have provided a safety device which permits of the escape of a portion of the fluid being compressed and which is adjustable to regulate the pressure at which such portion of fluid may escape. This safety device is shown best in Figures 5, 8 and 9 and comprises three longitudinal grooves 67 disposed in the outer periphery of the valve seat unit 33 and spaced apart equidistantly so that they coincide with the ports 32 in the casting through which the oil passes to the valve structure. These grooves extend forwardly, as illustrated best in Figure 9, and communicate with an annular groove 68 in the rear face of the disk 4 which in turn communicates with a passage 69 leading to a duct 70 of somewhat larger size which terminates in a threaded sleeve 71 whose outer end is beveled to form a valve seat 72 for a ball valve 73. This ball valve 73 is normally held resiliently upon its seat by means of a coil spring 74 which is adjustable to vary the pressure thereof through the medium of a set screw 75. This set screw 75 is threaded into the outer end of a bell-like member 76 whose inner end is internally threaded for the reception of the threaded sleeve 70. The bell-like member 76 has outlets 77 through which the escaping fluid may return to the chamber surrounding the casting 6.

It will be readily understood from this description that there is provided a safety device which obviates all danger of undue strain upon the gears which operate the pumping units and upon the apparatus generally. Moreover, it will be apparent that the pressure at which the controlling valve opens may be regulated by adjustment of the set screw to any desired extent.

An additional means for preventing the escape of fluid from the chamber within which the pumping units operate is illustrated best in Figures 9 and 11. This unit comprises a cup 78 whose base is apertured to receive and enclose the driven shaft 26. It also comprises an apertured gasket 79 disposed in the base of the cup 78 with a washer 80 superimposed upon the gasket and normally forced against the same with substantial pressure by means of a coil spring 81. The cup 78 is disposed in a socket 78a in the front face of the clutch housing so that the base of this cup is snugly held against the base of the socket. The coil spring exerts sufficient pressure to insure that the gasket will snugly fit upon the driven shaft 26. The result of this is that any liquid which tends to filter through the key way and the bearing on the sun gear 25 will be positively precluded from escapement along the driven shaft 26.

Figure 12:
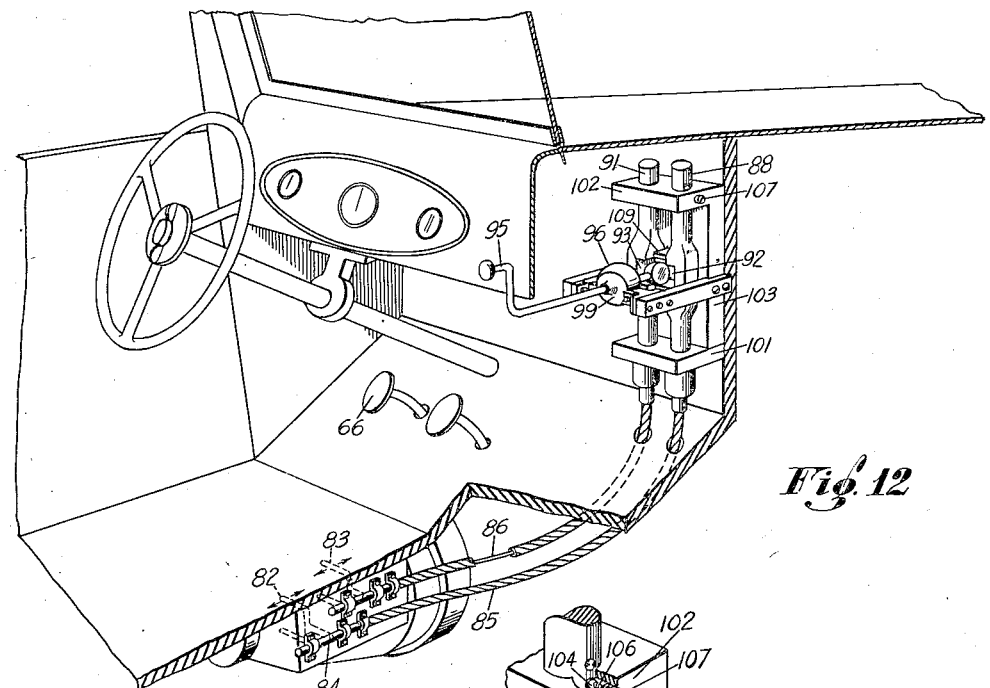
Figure 12 is a perspective view of a portion of a motor vehicle on which is mounted a mechanism which may be utilized if it is desired to operate my apparatus in conjunction with the normal form of gear shift.
Figure 13:
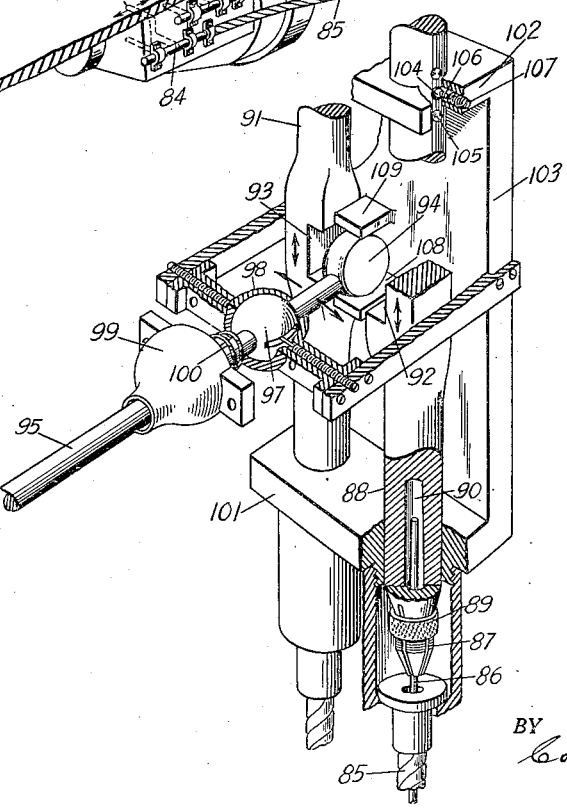
Figure 13 is a detail, in vertical section, of a portion of the mechanism shown in Figure 12.

In the vast majority of the operations necessary in the actual driving of a motor vehicle, my apparatus is fully effective in cooperation with the high speed gear or direct drive to meet the conditions which normally arise in the operations of the gear. However, a means for driving the vehicle rearwardly should be provided and it is desirable that a low speed gear also be provided for meeting certain special conditions, such as climbing and descending steep hills, et cetera. Intermediate speed gears are unnecessary. However, my apparatus may be utilized in conjunction with a low speed gear and a reverse gear alone or it may be utilized in conjunction with a gear shift such as commonly used now and in the past on motor vehicles. In Figures 12 and 13 I have illustrated one type of gear shift operating mechanism which may be readily used in conjunction with my apparatus.

This gear shift comprises a yoke 82 (shown in dotted lines in Figure 12) for effecting driving connection of the low or reverse gear. It also comprises a yoke 83 for effecting driving connection of the intermediate, and high speed gears. The yoke 82 is operable by a plunger 84 through the medium of a flexible cable 85 which embodies a steel rod 86 adjustably connected through the medium of gripping jaws 87 to a slidable member 88. The steel rod 86 may be adjusted by loosening the jaws 87 which are under the control of the ring 89 threaded thereon and by varying the extent to which this steel rod projects into the socket 90 in the slidable member 88. The yoke 83 is connected in a similar manner to the slidable member 91 and, because these connections are identical, a detailed description of both is unnecessary.

The members 88 and 91 are provided with opposing cut-out portions, respectively designated 92 and 93 which are designed to selectively receive the working end 94 of a gear shift lever 95 that is provided with a universal fulcrum 96. The universal fulcrum structure 96 may be of common form and is shown as comprising a ball 97 carried by the lever and movable within a socket embodying a body portion 98 and a cap plate 99 which, when in position, houses a spring 100 and holds such spring firmly against the ball 97 to retain this ball properly seated within the body portion of the socket.

The slidable members 88 and 91 are vertically movable within apertures provided in flanges 101 and 102 of a base plate 103 which may be secured to the dash, as shown in Figure 12. Each of the slidable members 88 and 91 is preferably held in each position of adjustment by means of a spring pressed ball 104 which selectively enters semispherical sockets 105 and which is backed by a spring 106 whose pressure may be adjusted by a set screw 107. The base plate 103 is further provided intermediate its length with projecting lugs 108 and 109 which are vertically spaced apart and which embrace the working end of the gear shift lever when it is in neutral position.

In operation of this gear shift mechanism, the handle of the lever may be actuated to move the working end thereof into either the cut-away portion 92 of the slidable member 88 or the cut-away portion 93 of the slidable member 91. When in position within the cut-away portion 92 of the slidable member 88, movement of this working end in one direction will render the low gear effective while movement in the opposite direction will render the reverse gear effective. When in position within the cut-away portion 93 of the slidable member 91, movement of this working end in one direction will render the intermediate gear effective while movement in the opposite direction will render the high gear effective.

It will be understood that this gear shift mechanism may take various forms and may be located at other places. The location illustrated and the mounting of the yoke operating plungers upon the side of the gear casing produces a saving in space which makes this structure desirable though, as indicated, other structures and locations may be used when desired.

In the operation of my apparatus, without regard to the use of gear shift mechanism, the application of adequate pressure to the pedal lever 66 will first disengage the friction clutch mechanism and will finally, through the medium of the thrust rod 41, move the valve 37 to fully uncover the ports 35 of the outer valve seat unit 33. If the engine is operating so that the crank shaft 1 and fly-wheel disk 2 are rotating, the disk 4, being secured thereto, is likewise rotated. The cylindrical member 3 and the casting 6 with the gear pumps therein likewise rotate with the disk 4. The result is that the fluid within the chamber whose periphery is formed by the cylindrical member 3 is centrifugally thrown out towards its periphery and builds up pressure adjacent the periphery so that this fluid is forced axially inward through the ports 31 as indicated by the arrows in Figure 8. The gear pumps, being rotated by the intermeshing relation of their gears 23 with the sun gear 25 causes the fluid entering the ports 31 to travel around the outer sides of the herring-bone gears as indicated by the arrows and then forces this fluid through the ports 32 and the ports 35 and thence through the sleeve which forms the valve seat unit past the valve seat 36 and back into the chamber, whence it is again thrown centrifugally out for return through the ports 31. This circulating action continues without restriction as long as the pedal lever 66 is sufficiently depressed to bring about complete uncovering of the ports 35 of the valve seat unit 33.

However, as soon as pressure upon the pedal lever 66 is released sufficiently to permit the valve 37 to partially cover the ports 35, the interference with the free circulation of the fluid and consequent resistance to the rotation of the herring-bone gear pumps applies a torque to the sun gear and consequently to the driven shaft 26. If the driven shaft is connected to the driving wheel of the motor vehicle and the inertia of the vehicle is not too great, the vehicle will start to move. Under normal conditions this inertia will be such that forward movement of the vehicle will occur shortly after the valve 37 starts to close the ports 35.

Further release of pressure upon the pedal lever 66 and continued closing of the ports 35 as a result thereof will rapidly increase the torque applied to the sun gear 25 and the driven shaft 26 and the structure is such that this torque increases rapidly until it approximates a 1 to 1 ratio. At about the time this condition occurs, the friction clutch becomes effective to directly couple the crank shaft and the driven shaft through the medium of the cylinder 3, the disk 4 and the fly-wheel disk 2 and to automatically render the flowing power transmission mechanism unnecessary for continuance of forward movement.

It will be understood that my flowing power transmission mechanism may be utilized whether the motor vehicle is being driven in low gear, intermediate gear or high gear, though its main function and advantage consists in its use when the vehicle is in high gear. As a matter of fact, regardless of which gear is being utilized, my flowing power transmission mechanism always offers a smooth and easy approach to the clutching action of the friction clutch, so that this clutching action may be rendered effective smoothly and without jar or slippage.

When the crank shaft is driving the driven shaft through the medium of the friction clutch, this friction clutch may be rendered temporarily ineffective at any instant merely by depressing the pedal lever 66 so as to disconnect the clutch and render the flowing power transmission mechanism immediately effective. This is particularly desirable as a substitute for the laborious shifting of gears, such as is commonly encountered at street intersections and, in fact, under practically all conditions wherein it has previously been necessary or desirable to shift to intermediate gear, as well as under most conditions wherein it has previously been necessary or desirable to use the low gear.

Moreover, my flowing power transmission mechanism permits of the selection of any one of an infinite number of torque applications to the driven shaft, so that the amount of torque applied to the driven shaft may be selected and varied at will. The amount of torque applied depends upon the extent to which the pedal lever is depressed and makes possible the selection and application of a torque best suited to the conditions of inertia that must be overcome in any given situation by the motor. In other words, the pedal lever may be depressed to any extent necessary to insure that the initiation of rotation of the driven shaft or the increase of the rotation thereof may be effected smoothly and evenly, with this smoothness and evenness readily maintainable until the driven shaft is traveling at a speed of rotation so closely approximating the speed of rotation of the driving shaft that the clutching action of the friction clutch will take place smoothly and without jar or slippage.

It will be seen that my combination of friction clutch and flowing power transmission makes possible the release of the friction clutch by a very slight movement which leaves the flowing power transmission mechanism immediately effective with a minimum oil circulation, so that the car can be started with an oil clutching action just short of a 1 to 1 ratio. Likewise, if the vehicle is traveling in high and more power is needed, the friction clutch may be released and the flowing power transmission mechanism immediately rendered effective with a driving action which is just short of a 1 to 1 ratio.

A moment's consideration will show the great saving in time and effort which arises from the fact that it is merely necessary to slightly depress the pedal lever in comparison with the manipulation of a gear shift which is now necessary when it is desired to increase the power applied to the driven shaft, as in starting upon a level surface, starting after stopping at street intersections and various operations of a similar nature.

It is important also to note that, with my device, the cylindrical member 3, the casting 6 with the gear pumps therein and with the gears which are carried thereby as well as practically all of the parts of the friction clutch mechanism travel as a unit with the disk 4 and with the fly-wheel disk 2. As a matter of fact, the only unit which remains stationary within the chamber formed by the cylindrical member 3 and associated parts while the driven shaft is not rotating is the sun gear 25.

One result of this is that practically all the parts of my flowing power transmission mechanism and of my friction clutch travel with the fly-wheel disk both when the driven shaft is stationary and when it is rotating, so that this entire group of mechanisms serves as a fly-wheel. Furthermore, owing to the fact that there are no parts projecting beyond the periphery of the cylinder 3, this fly-wheel structure remains exceedingly small, and, in fact, is approximately thirty per cent smaller in diameter than the fly-wheels commonly used in motor vehicles as well as approximately twenty per cent lighter in weight.

Another important advantage of my apparatus, which arises from the fact that the cylindrical member 3, the casting 6 with the gear pumps therein and with the gears on such pumps travel as a unit with the disk 4, is that they do not offer a resistance to the oil within the chamber when the driven shaft is stationary, as they would if the pumps and associated mechanism were carried by the driven shaft. The fluid within the chamber, being constantly subject to centrifugal force, possesses a markedly increased density and offers considerable resistance to any objects relatively movable therein. Therefore, the location of such units as the pump structures and casings upon the driven shaft and projecting into the fluid which is traveling with the crank shaft places a load upon the engine when it should be idling. Moreover, it produces a condition wherein the engine is subjected to one fly-wheel effect when the driven shaft is stationary and to another fly-wheel effect of markedly different value when the driven shaft is rotated. This sets up a condition which renders extremely difficult, if not impossible, the proper computation of fly-wheel forces to insure a smooth working engine under all conditions of operation.

Another advantage of my invention arises from the fact that my flowing power transmission mechanism is associated with a friction clutch, so that synchronization of the speed of rotation of the driving and driven shafts at the time the clutching operation occurred is not necessary, since the final clutching action is by a friction clutch as opposed to a jaw clutch.

Another advantage of my invention arises from the fact that the passage of fluid through the pumping units is controlled by a single valve located at the axial center of the device, while no valves or openings are provided at the outside of the casing. The result is that the fluid is thrown out to points adjacent the outside of the casing by centrifugal force which builds up pressure at the inlets of the radial duct, so that the oil then tends to flow radially inward under such pressure, being assisted by the gear pumps as long as circulation exists. Furthermore, my avoidance of outlets or valves at or adjacent the outside of the casing obviates all danger of leakage at the outside of the casing, which would otherwise be relatively acute because of the centrifugal pressure of the fluid. Likewise, the position of the valve at the center of the casing greatly reduces the danger of leakage, since the normal operation of my device serves to throw the fluid outwardly and leaves a relatively low pressure area at the center, which also greatly decreases the danger of leakage axially of the device. Another advantage of my invention arises from the particular structure of the valve which I have utilized. In the first place, my valve is so constructed that it controls ports disposed about its periphery and that, in closing these ports, it makes contact at its end with the valve seat so that the end of the port-containing sleeve is also effectively closed. This gives a dual closing action which positively insures that the flow of fluid through the pumps may be completely shut off.

A still further advantage of my valve structure arises from the triangular shape of the ports in the valve seat unit. This permits of a free circulation of the fluid through these valve ports, owing to the ample total area thereof. At the same time, it permits of the shutting off of these ports completely by a valve movement of minimum length. In addition, it permits of the opening of these ports to a relatively slight extent at the time the friction clutch is in a position just short of its position of engagement, so that the flowing pressure transmission mechanism may very closely approximate the 1 to 1 driving ratio which results during the actual engagement of the friction clutch.

Another advantage of my invention arises from the fact that the valve which I utilize, serves merely as a valve and not as a supporting mechanism for associated parts. This avoids danger of wear and distortion and permits of the production of a valve which may be readily opened by a thrust rod with a minimum pressure and closed by a spring of relatively slight strength. Furthermore, the fact that my valve is independent of the driven shaft protects it from the pressure fluid and precludes danger of leakage through the valve and along the driven shaft. Likewise, my valve is readily removable and replaceable.

A further advantage of my invention arises from the particular type of pumping structure which I utilize. The herring-bone gears which are disposed in intermeshing relation give a pressure which is greatly superior to that attainable by straight tooth gears. These herring-bone gears are provided with end supports, instead of being suspended on their own teeth which would tend to wear away such teeth as well as the surfaces on which they rest and operate, with a consequent occurrence of leakage and undesirable noise.

Another advantage of my invention arises from the special shape of casting which I utilize and which provides a plurality of pump housings. This special shape of casting permits of the ready mounting of my pumping units in substantial parallelism with the axis of the crank shaft rather than being radial thereto with a consequent increase in size of the entire unit where pumps of equivalent power are utilized. Furthermore, the special form of casting and the gear pump housings provided therein permit of the use of pressure plates of relatively small area with the resultant decrease in tendency towards leakage.

It will also be noted that my driven shaft is longitudinally immovable, which decreases danger of leakage and avoids other undesirable drawbacks. The location of my friction clutch outside of the casing containing the operating fluid prevents deterioration of the clutch with a consequent introduction of foreign matter into the oil and inevitable destruction of or injury to the gear pumps and the operating gears therefor.

It will be seen from this that I have provided a structure which is simple and compact and which embodies a fly-wheel unit that may be readily constructed to have the proper requirements of static and dynamic balance. It will also be apparent that my structure possesses numerous advantages in addition to those which have been enumerated. Some of these additional advantages will appear from the appended claims.

It will also be understood that my apparatus is capable of application to stationary engines as well as to engines designed for driving motor vehicles. As a matter of fact, it is applicable to practically any apparatus wherein a rotatable shaft is designed to be driven by a rotatable driving shaft.

Having thus described my invention, what I claim is:

1. A mechanism for transmitting power from a driving shaft to a driven shaft comprising a set of planetary gears, a fluid power transmission mechanism comprising a fluid-containing chamber, a pump, operating in said chamber, a valve seat unit associated with said pump and a valve for cooperation with said valve seat unit, said valve seat unit being of tubular form with ports in its periphery and with an opening in its end and said valve being constructed to cooperate with said ports and to close the opening in the end of said valve seat unit.

2. A mechanism for transmitting power from a driving shaft to a driven shaft comprising a set of planetary gears, a fluid power transmission mechanism comprising a fluid-containing chamber, a pump operating in said chamber, a valve for controlling the passage of fluid through said pump, a clutch associated with said fluid pumping mechanism, and a means for operating said valve and said clutch comprising a plurality of members which are operated by a single means and which have anti-friction means disposed therebetween.

3. A mechanism for transmitting power from a driving shaft to a driven shaft comprising a set of planetary gears, a fluid power transmission mechanism comprising a fluid-containing chamber, a pump operating in said chamber, a valve for controlling the passage of fluid through said pump, an actuating means for said valve which is carried by the driven shaft, a clutch associated with said fluid pumping mechanism, a means for operating said clutch which is carried by the driving shaft, a single means for applying pressure to simultaneously actuate said valve actuating means and said clutch, and anti-friction means between said valve actuating means and said clutch actuating means.

4. A mechanism for transmitting power from a driving shaft to a driven shaft comprising a set of planetary gears, a fluid power transmission mechanism comprising a fluid-containing chamber into which the driven shaft projects, and a baffle plate for diverting the fluid from the points of entrance of said driven shaft into said chamber.

5. A mechanism for transmitting power from a driving shaft to a driven shaft comprising a set of planetary gears, a fluid power transmission mechanism comprising a fluid-containing chamber, pumps operating in said chamber, a valve for controlling the passage of fluid through said pumps, a driven shaft projecting through one wall of said chamber, a thrust rod extending through said driven shaft and into said chamber for operation of said valve, and means for preventing leakage around said thrust rod.

6. A mechanism for transmitting power from a driving shaft to a driven shaft comprising a fluid-containing chamber, a pump operating within said chamber, a valve for controlling the passage of fluid through said pump, a thrust rod for operating said valve, a clutch for finally connecting said driving shaft to said driven shaft, and a driven shaft designed to carry the driven plate of the clutch, a valve actuating thrust rod, and a set of planetary gears comprising a driving gear for actuating said pump and a sun gear with which said driving gear meshes mounted on said driven shaft.

7. A mechanism for transmitting power from a driving shaft to a driven shaft comprising a fluid power transmission mechanism and a set of planetary gears for progressively increasing the torque applied by the driving shaft to the driven shaft, a clutch for finally clutching the driving shaft to the driven shaft, manually operable means for operating said clutch at will and for simultaneously causing the fluid power transmission mechanism and the planetary gears to progressively increase the torque applied by the driving shaft to the driven shaft, said fluid power transmission mechanism having pumping units which are located in housings carried by the driving shaft, said set of planetary gears being located outside of said pumping unit housings.

8. A mechanism for transmitting power from a driving shaft to a driven shaft comprising a fluid power transmission mechanism and a set of planetary gears for progressively increasing the torque applied by the driving shaft to the driven shaft, a friction clutch for finally clutching the driving shaft to the driven shaft, manually operable means for operating said clutch at will and for simultaneously causing the fluid power transmission mechanism and the planetary gears to progressively increase the torque applied by the driving shaft to the driven shaft, said fluid power transmission mechanism having pumping units which are located in a plurality of separate housings carried by the driving shaft, said set of planetary gears being located outside of said pumping unit housings.

9. A mechanism for transmitting power from a driving shaft to a driven shaft comprising a fluid power transmission mechanism and a set of planetary gears for progressively increasing the torque applied by the driving shaft to the driven shaft, a clutch for finally clutching the driving shaft to the driven shaft, manually operable means for operating said clutch at will and for simultaneously causing the fluid power transmission mechanism and the planetary gears to progressively increase the torque applied by the driving shaft to the driven shaft, said fluid power transmission mechanism having pumping units which are located in a plurality of separate housings carried by a fly-wheel disk mounted upon the driving shaft, said set of planetary gears being located outside of said pumping unit housings.

10. A mechanism for transmitting power from a driving shaft to a driven shaft comprising a fluid power transmission mechanism and a set of planetary gears for progressively increasing the torque applied by the driving shaft to the driven shaft, a clutch for finally clutching the driving shaft to the driven shaft, manually operable means for operating said clutch at will and for simultaneously causing the fluid power transmission mechanism and the planetary gears to progressively increase the torque applied by the driving shaft to the driven shaft, said fluid power transmission mechanism having pumping units located in a plurality of separate housings, the pumping units of said mechanism and substantially all the parts of said clutch being rotatable with said driving shaft when said driven shaft is not being rotated, said set of planetary gears being located outside of said pumping unit housings.

11. A mechanism for transmitting power from a driving shaft to a driven shaft comprising a set of planetary gears, a fluid power transmission mechanism comprising a fluid-containing chamber carried upon and rotatable with said driving shaft, pumping units located in housings disposed within said fluid-containing chamber and carried upon said driving shaft so that they are rotatable with the fluid and with said driving shaft when the driven shaft is not being rotated, said set of planetary gears being located outside of said pumping unit housings but within the fluid containing chamber, a clutch for finally clutching the driving shaft to the driven shaft, and manually operable means for operating said clutch at will and for simultaneously causing the fluid power transmission mechanism and the planetary gears to progressively increase the torque applied by the driving shaft to the driven shaft.

12. A mechanism for transmitting power from a driving shaft to a driven shaft comprising a set of planetary gears, a fluid power transmission mechanism comprising a fluid containing chamber carried upon and rotatable with said driving shaft, pumping units located in housings disposed within said fluid containing chambers and carried upon said driving shaft, said set of planetary gears being located outside of said pumping unit housings but within the fluid containing chamber, a clutch for finally clutching the driving shaft to the driven shaft including a clutch housing carried upon and rotatable with said driving shaft when the driven shaft is not being rotated, and manually operable means for operating said clutch at will and for simultaneously causing the fluid power transmission mechanism and the planetary gears to progressively increase the torque applied by the driving shaft to the driven shaft.

13. A mechanism for transmitting power from a driving shaft to a driven shaft comprising a set of planetary gears, a fluid power transmission mechanism comprising a fluid containing chamber carried upon and rotatable with said driving shaft, a pumping unit disposed in a separate housing within said fluid-containing chamber and carried upon said driving shaft, said set of planetary gears being located outside of said pumping unit housing but within the fluid-containing chamber, a clutch for finally clutching the driving shaft to the driven shaft including a clutch housing, a pressure plate operating within said housing an operating mechanism therefor, said housing, said plate and said operating mechanism being carried upon said driving shaft when the driven shaft is not being rotated, and manually operable means for actuating said clutch at will and for simultaneously causing the fluid power transmission mechanism and the planetary gears to progressively increase the torque applied by the driving shaft to the driven shaft.

14. A mechanism for transmitting power from a driving shaft to a driven shaft comprising a fly-wheel secured to the driving shaft and rotatable therewith, a substantially cylindrical fluid-containing housing secured to the fly-wheel, a casting secured to said fly-wheel and having a plurality of separate chambers formed therein each of which contains a pumping unit, each pumping unit comprising a pair of intermeshing herring-bone gears, the axes of said gears lying in a plane substantially tangential to the periphery of the driving shaft, each of said pumping unit chambers having a radially extending port for receiving the fluid at a point adjacent the periphery of said fluid-containing chamber and conducting it radially inward under subjection to said pumping unit, and each of said pumping unit chambers having a radially extending outlet port communicating with a centrally disposed valve chamber, a cylindrical valve disposed in said valve chamber, said valve having triangular shaped ports formed therein which normally communicate with the outlet ports of the pumping unit chambers, a set of planetary gears including a driven gear connected to each of the pumping units which meshes with a centrally disposed sun gear, said sun gear being carried by the driven shaft which projects into said fluid-containing chamber, a clutch housing carried by the fluid-containing chamber, a pressure plate operating within said housing and operating mechanism therefor, said housing, said plate and said operating mechanism being carried upon said driving shaft when the driven shaft is not being rotated, and means for manually actuating said clutch at will to cause frictional engagement of said pressure plate and the clutch housing and for simultaneously causing said valve to progressively close the outlet ports of said pumping unit chambers.

15. A mechanism for transmitting power from a driving shaft to a driven shaft comprising a fly-wheel secured to the driving shaft and rotatable therewith, a fluid-containing housing secured to the fly-wheel, a plurality of separate housings carried by the fly-wheel within said fluid-containing housing and each of which contains a pumping unit, each pumping unit comprising a pair of intermeshing herring-bone gears, each of said pumping unit housings having a radially extending port for receiving the fluid at a point adjacent the periphery of said fluid-containing chamber and conducting it radially inward under subjection to said pumping unit, each of said pumping unit housings having a radially extending outlet port communicating with a centrally disposed valve chamber, a cylindrical valve disposed in said valve chamber, said valve having triangular shaped ports formed therein which normally communicate with the outlet ports of the pumping unit housings, a set of planetary gears including a driven gear connected to each of the pumping units which meshes with a centrally disposed sun gear, said sun gear being carried by the driven shaft which projects into said fluid containing chamber, a clutch for finally clutching the driving shaft to the driven shaft, and means for manually actuating said clutch at will and for simultaneously causing said valve to progressively close the outlet ports of said pumping unit housings.

16. A mechanism for transmitting power from a driving shaft to a driven shaft comprising a fluid-containing housing secured to the driving shaft and rotatable therewith, a plurality of separate housings carried by the driving shaft within said fluid-containing housing and each of which contains a pumping unit, each of said pumping unit housings having a radially extending port for receiving the fluid at a point adjacent the periphery of said fluid-containing chamber and conducting it radially inward under subjection to said pumping unit, each of said pumping unit housings having a radially extending outlet port communicating with a centrally disposed valve chamber, a valve disposed in said valve chamber, said valve having triangular shaped ports formed therein which normally communicate with the outlet ports of the pumping unit housings, a set of planetary gears including a driven gear connected to each of the pumping units which meshes with a centrally disposed sun gear, said sun gear being carried by the driven shaft which projects into said fluid-containing chamber, a clutch for finally clutching the driving shaft to the driven shaft, and means for manually actuating said clutch at will and for simultaneously causing said valve to progressively close the outlet ports of said pumping unit housings.

17. A mechanism for transmitting power from a driving shaft to a driven shaft comprising a fluid-containing housing secured to the driving shaft and rotatable therewith, a plurality of separate housings carried by the driving shaft within said fluid-containing housing and each of which contains a pumping unit, each of said pumping unit housings having an inlet port for receiving the fluid from said fluid-containing chamber and conducting it into the pumping unit housing, each of said pumping unit housings having an outlet port communicating with a centrally disposed valve chamber, a controlling valve disposed in said valve chamber for controlling the flow of fluid through the outlets of the pumping unit housings, a set of planetary gears including a driven gear connected to each of the pumping units which meshes with a centrally disposed sun gear, said sun gear being carried by the driven shaft which projects into said fluid-containing chamber, a clutch for finally clutching the driving shaft to the driven shaft, and means for manually actuating said clutch at will and for simultaneously causing said valve to progressively close the outlet ports of said pumping unit housings.

THEODORE ONGARO.